July 28, 1953 L. HAWORTH 2,646,847
CONTROL FOR AIRCRAFT GAS-TURBINE POWER PLANTS
HAVING VARIABLE-PITCH AIRSCREWS
Filed Dec. 10, 1948 2 Sheets-Sheet 1
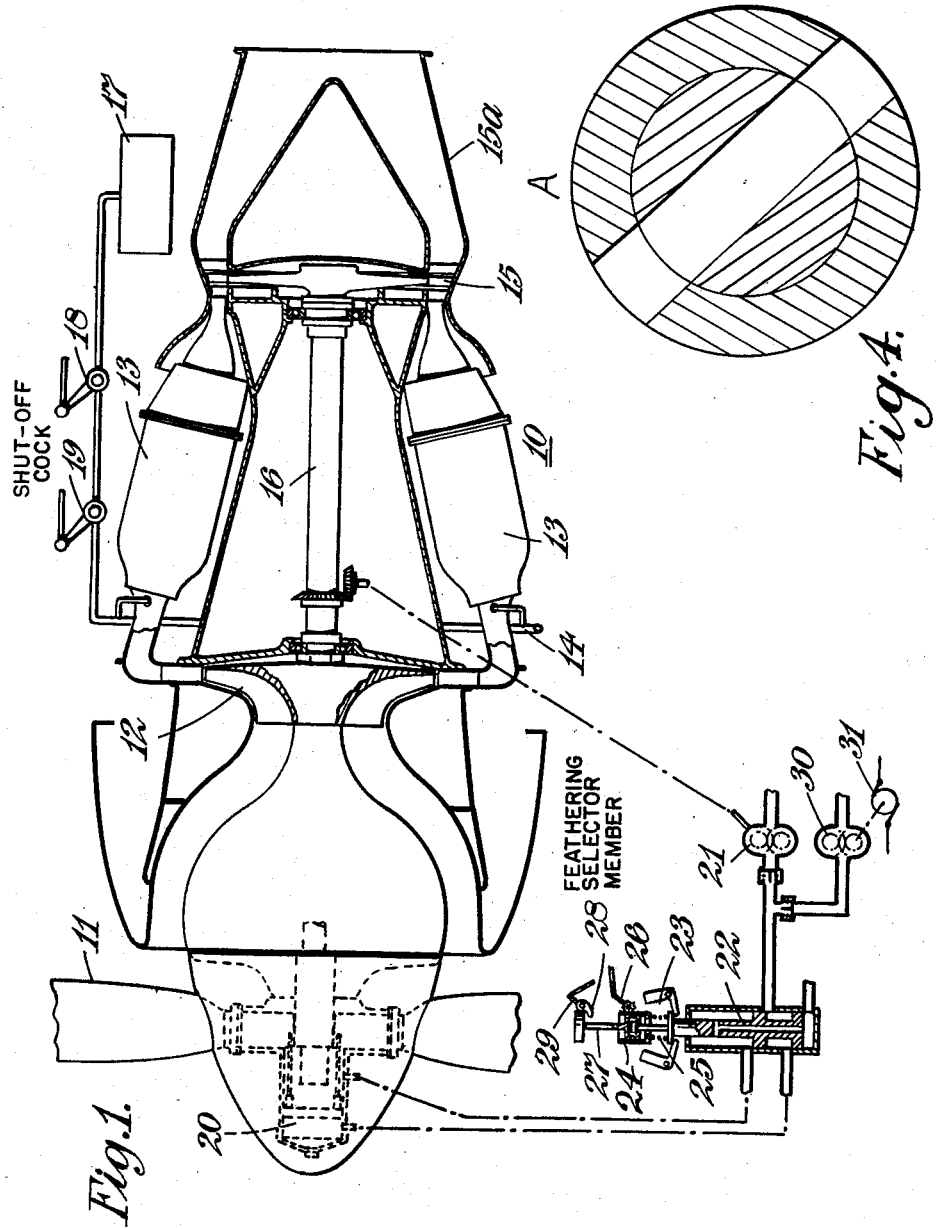
INVENTOR
LIONEL HAWORTH July 28, 1953
L. HAWORTH
2,646,847
CONTROL FOR AIRCRAFT GAS-TURBINE POWER PLANTS
HAVING VARIABLE-PITCH AIRSCREWS
Filed Dec. 10, 1948
2 Sheets-Sheet 2
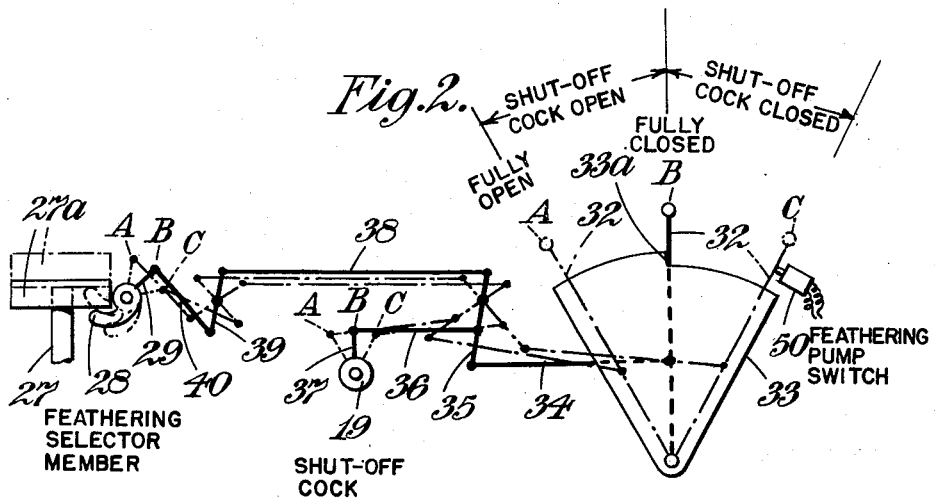
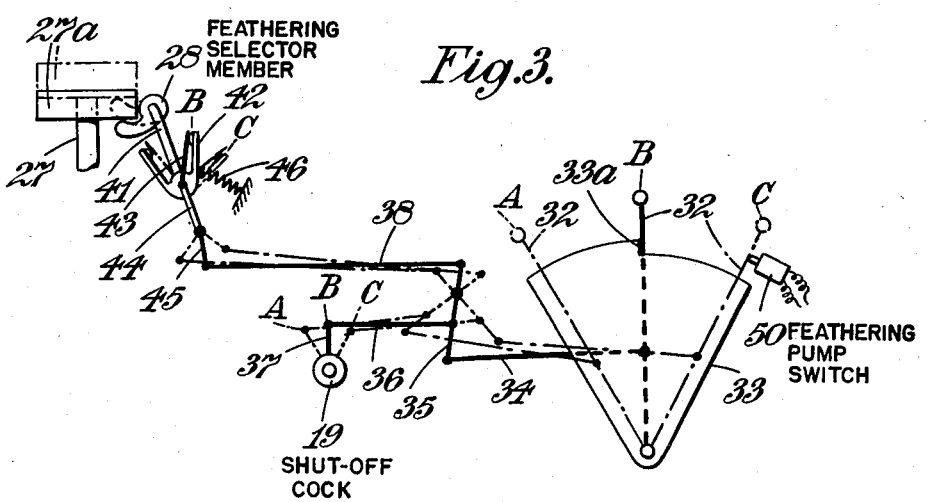
INVENTOR
LIONEL HAWORTH
by Wilkinson Mawhinney
Attorneys

UNITED STATES PATENT OFFICE 2,646,847

CONTROL FOR AIRCRAFT GAS-TURBINE POWER PLANTS HAVING VARIABLE-PITCH AIRSCREWS

Lionel Haworth, Derby, England, assignor to Rolls-Royce Limited, Derby, England, a British company Application December 10, 1948, Serial No. 64,586
In Great Britain January 5, 1948

5 Claims. (Cl. 170—135.74)

This invention relates to controlling aircraft power plants of the type comprising an engine driving an airscrew.

It is the usual practice in the fuel systems of certain aircraft engines, and particularly in the case of gas-turbine engines, to provide a fuel control shut-off valve or a high-pressure shut-off cock, hereinafter referred to as "a shut-off cock," the shut-off cock being open for starting and normal running of the engine and closed on shut-down of the engine. The shut-off cock is normally additional to a throttle or equivalent fuel control means employed for varying the power of the engine when it is running. However, in certain cases the shut-off cock may act as a throttle having a fully closed position in which fuel cannot pass to the engine.

It is also usual with high performance aircraft engines to provide means for feathering the air-screw, that is for moving the blades of the air-screw to an extremely coarse pitch, to reduce the drag on the aircraft when in flight if the air-screw and the associated engine are inoperative. A mechanism for effecting feathering of an air-screw will be referred to hereinafter as "a feathering mechanism."

It has been the practice heretofore to have separate controls for the shut-off cock and feathering mechanism and it has now been found desirable to provide means for actuating the shut-off cock and feathering mechanism in co-relation to avoid disadvantages which would otherwise arise from the independent and incorrect operation of these parts. For instance, it is undesirable to permit feathering of an air-screw when the engine is running.

It is also desirable in aircraft to avoid providing too many control levers for operation by the pilot of an aircraft or an engineer and also to reduce the number of control linkages required between an engine and a cockpit.

According to the present invention, a power plant for an aircraft comprises an engine, means to supply fuel to said engine, an air-screw driven by the engine, a feathering mechanism for the air-screw, a shut-off cock for controlling the fuel supply from said fuel supply means, said shut-off cock being capable of a movement in its fully closed state beyond the position at which it becomes fully closed, and means operatively interconnecting said shut-off cock and said feathering mechanism such that the feathering mechanism is set to feather the air-screw when the shut-off cock partakes of said movement in its fully closed state. By controlling the feathering mechanism in this manner the operations of the shut-off cock and the feathering mechanism are inter-related and feathering of the air-screw when the engine is running can be avoided. Furthermore, a single control lever only is required for controlling both the shut-off cock and the feathering mechanism, thus reducing the number of control linkages between an engine and the cockpit.

According to a feature of this invention, the said means operatively interconnecting the shut-off cock and feathering mechanism may comprise a control lever linked to said shut-off cock and to said feathering mechanism and having two ranges of movement, in the first of which ranges the shut-off cock can be moved between its open position and its fully closed position and in the other of which ranges the shut-off cock can be constrained to partake of said movement in the fully closed state and the feathering mechanism can be set to feather the air-screw. Conveniently the control lever will be manually operated and move in a gate defining the two ranges of movement thereof.

According to another feature of this invention, the linkage between the control lever and the feathering mechanism may comprise a lost motion connection, so that during the first range of movement of said control lever, the feathering mechanism is not actuated and so that during movement of the control lever in the second range the feathering mechanism is set to feather the air-screw.

According to yet another feature of this invention, instead of providing a lost motion connection as above set forth, a part of the feathering mechanism may be arranged to be moved throughout both ranges of movement of the control lever and be arranged to be inoperative to feather the air-screw during that part of its movement corresponding to said first range of movement of the control lever.

Two embodiments of this invention will now be described with reference to the accompanying drawings in which:

Figure 1 is a diagrammatic view of an aircraft power plant of the kind to which this invention relates;

Figure 2 illustrates diagrammatically one form of control mechanism for the power plant of Figure 1, Figure 3 illustrates an alternative form of said control mechanism, and Figure 4 is a cross sectional view of the type of rotary plug shut-off cock in its fully open position used in this invention.

Referring to Figure 1, there is illustrated an aircraft power plant comprising a gas-turbine engine generally indicated by reference numeral 10 driving an air-screw 11 of the variable pitch type.

The gas-turbine engine comprises a compressor 12 delivering compressed air to a series of combustion chambers 13 in which fuel delivered to them through supply pipe 14 is burnt to heat the air, a turbine 15 receiving the heated air from the combustion chambers 13 to be driven thereby, said turbine being interconnected by a shaft 16 to the compressor to drive it and to the air-screw 11, and an exhaust unit 15a through which the exhaust gases from the turbine are delivered to atmosphere. The exhaust unit 15a may be in the form of a jet pipe so that the exhaust gases issuing from the engine assist in the propulsion of the aircraft. The fuel is supplied to the pipe-line 14 from any convenient form of fuel supply means, generally indicated at 17, and the flow to the pipe-line 14 is controlled by a throttle 18 which may be of any convenient form and actuated by a control linkage from the aircraft cockpit. The pipe-line 14 also comprises a high-pressure shut-off cock 19 which is open during running of the engine and is fully closed when the engine is stopped.

The air-screw 11 is provided with a pitch change mechanism comprising an hydraulic piston and cylinder motor 20 supplied with servo fluid from an engine driven pump 21 under control of a piston valve 22. The piston valve forms part of a conventional constant speed unit which comprises a centrifugal governor 23 arranged to operate the valve 22 by raising and lowering piston valve according to the position of the governor weights, a datum setting device for the constant speed unit comprising a sleeve 24 providing an abutment for the centrifugal governor spring 25, which sleeve can be raised and lowered by operation of a lever 26, and a feathering control comprising a plunger 27 slidable in the sleeve 24 and engaged by a yoke with the piston valve 22, which plunger 27 can be raised and lowered by a feathering selector member 28 under control of a lever 29.

The servo fluid supplied from the engine driven pump 21 is operative only during running of the engine, and in order that the air-screw may be feathered when the engine is stopped, an alternative supply of servo fluid is provided by a pump 30 driven from an electric motor 31.

Referring now to Figure 2, there is illustrated a suitable control for the shut-off cock 19 and the feathering selector mechanism for the air-screw 11, whereby the operation of the shut-off cock and the feathering mechanism can be properly co-related. The shut-off cock 19 may be of the rotary plug type, such as shown in Figure 4 of the drawings and is so arranged that it has of the drawings and is so arranged that it has angular ranges of movement, in one of which ranges it can be moved from the fully open to the fully closed position and in the other of which ranges it can be moved beyond the fully closed position whilst remaining fully closed.

The control mechanism comprises a manual control lever 32 moving in a gate 33 so as to have two ranges of movement which are separated by a step 33a in the gate. The lever 32 is connected by a link 34 to a rocking lever 35 which in turn is connected by a link 38 to the control arm 37 of the shut-off cock. The rocking lever 35 is also connected by a link 38 to a further rocking lever 39 which is connected by a link 40 to the feathering selector member 28. The linkage is so dimensioned that with the control lever in the position A at one end of its travel in the gate 33 the shut-off cock occupies a corresponding position in which it is fully open and the feathering selector member 28 is moved away from the head 27a of the plunger 27 so that the feathering mechanism is inoperative. Movement of the control lever 32 from the position A to the position B is transmitted both to the shut-off cock 19 through the control arm 37 of the shut-off cock and to the lever 29 controlling the feathering control member 28 to rock them respectively to the full line positions indicated. When the control lever reaches the position B, the control arm 37 of the shut-off cock 19 has reached a position in which the shut-off cock is just fully closed and the lever 29 has reached a position in which the feathering control member is just about to abut against the head 27a of the plunger 27.

Movement of the control lever 32 from the position B to the position C at the opposite end of its range of movement is also transmitted to the control arm 37 and to the lever 29 moving them to the chain line positions indicated. Movement of the control arm 37 between positions B and C moves the shut-off cock, plunger or plug through its range of movement in its fully closed state. Movement of the lever 29 from the position B to the chain line position C rotates the feathering control member 28 around its pivot into engagement with the head 27a of the plunger 27 to raise it to the chain line position shown, thus forcibly raising the piston valve 22 against the action of spring 25 and causing the air-screw blades to be feathered. In position C the lever 32 contacts and closes an electrical switch 50 controlling the current supply to the feathering pump motor 31.

During movement of the control lever 32 from position C to position B, the control arm 37 of the shut-off cock causes movement of the plug or plunger of the shut-off cock in the opposite direction but still in its fully closed state and allows the plunger 27 of the feathering mechanism to be lowered under the action of the spring 25, thus returning the piston valve to a position in which the normal operation of the constant speed unit can be effected.

It will be seen that with the mechanism as above set forth, the air-screw cannot be feathered unless the fuel supply to the engine is cut off by the shut-off cock 19.

Referring now to Figure 3, an alternative form of control mechanism for the shut-off cock 19 and for the feathering control member 28 is shown. The same reference numerals are used in this figure as are used for like parts illustrated in Figure 2. In this construction instead of the feathering control member being movable between three positions, between two of which it is inoperative to cause the air-screw blades to be feathered, the feathering control member 28 moves between two positions, illustrated in full and chain lines, in one of which the feathering control member 28 is just about to lift the plunger 27 and in the other of which it has fully raised the plunger 27. Thus, the feathering control member 28 occupies positions corresponding to positions B and C of the control lever 32.

In this construction the feathering control member 28 is carried on a rotatable cross-arm 41 which carries at its opposite end a forked lever 42 having a pair of abutments at the end of the prongs of the fork. The forked lever 42 is arranged to be moved by a rocking arm 43 linked to the control lever 32, the end of the rocking arm 43 being arranged to move between and to engage the abutments at the ends of the prongs of the forked lever. The rocking arm 43 is carried on a rotatable cross-arm 44 arranged coaxially with the cross-arm 41 and provided at its opposite end with a radial arm 45 connected to the link 38. A spring 46 is provided to rock the forked lever 42 from the position C to the position B.

The operation of this control mechanism is as follows:

With the control lever 32 in the position A the shut-off cock is fully open and the rocking arm 43 occupies the chain line position shown against the abutment on the left-hand prong of the forked lever 42. During movement of the control lever 32 from the position A to position B, the shut-off cock is moved to its fully closed position and the rocking arm 43 moves between the abutment on the left-hand prong of the forked lever into engagement with the abutment on the right-hand prong, so that during his movement of he control lever the feathering control member 28 occupies a fixed position. During movement of the control lever 32 from the position B to the position C and thus during movement of the shut-off cock in its fully closed state, the rocking arm 43 presses the forked lever to the right as viewed in the drawing against the action of spring 46, thereby causing the feathering control member 28 to rotate and to lift the plunger 27 to its chain line position in which it over-rides the constant speed unit and allows the air-screw to be feathered.

During movement of the control lever 32 from the position C to the position B, the rocking arm 43 tends to move away from the right-hand prong of the forked lever 42, which, however, follows the movement of the rocking arm 43 due to the action of the spring 46. When the control lever 32 reaches position B the forked lever will have returned to its full line position in which the piston valve can occupy a position in which the air-screw can be moved to a normal setting. During movement of the control lever 32 from the position B to position A, that is during opening of the shut-off cock 19, the rocking arm 43 moves across the forked lever 42 between the abutment on the right-hand prong of the abutment on the left-hand prong.

Should for any reason the forked lever 42 have failed to follow up the movement of the rocking arm 43 to reach the position B, during movement of the shut-off cock from the position B to position A the rocking arm 43 will bear on the left-hand abutment of the forked lever 42 and force it into its full line position. Thus, it is impossible for the feathering mechanism to be operative whilst the engine is running.

The control lever 32 is arranged to operate switch 50 controlling current supply to motor 31 for driving the pump 30 at a suitable point in its movement in the gate 33. In this and the previous arrangement a suitable device can be incorporated for breaking the motor circuit on completion of the feathering operation; whilst a similar switching device may be incorporated for switching the motor 31 on to effect unfeathering of the air-screw, for example by arranging a switch to be closed on movement of the lever 32 from position C to position B.

I claim:

1. A power plant for an aircraft comprising an engine, means to supply fuel to said engine, an airscrew driven by the engine, a feathering mechanism for the airscrew, means for controlling the fuel supply from said fuel supply means and for completely cutting off the supply of fuel to the engine and comprising a shut-off cock having a range of movement from its fully open to its fully closed position and a second range of movement in its fully closed state to a position beyond its fully closed position, means operatively interconnecting said cock and said feathering mechanism so that the feathering mechanism is set to feather the airscrew only when said cock partakes of said movement in its fully closed state, and control means operatively connected to said cock and having two ranges of movement, in the first of which the cock is moved between its open position and its fully closed position and in the other of which the cock is moved to partake of said movement in the fully closed state.

2. A power plant as claimed in claim 1, wherein said control means comprises a control lever and said feathering mechanism comprises a feathering selector member connected to said control lever to move therewith throughout its full movement and a feathering control member arranged to be displaced by said feathering selector member during movements of said feathering selector member corresponding to movement of said control lever in its second range of movement.

3. A power plant for an aircraft comprising an engine, means to supply fuel to said engine, an airscrew driven by the engine, a feathering mechanism for the airscrew, a shut-off cock in said fuel supply means for controlling the fuel supply from said fuel supply means, said shut-off cock being constructed for a movement in its fully closed state beyond the position at which it becomes fully closed, means operatively interconnecting said shut-off cock and said feathering mechanism, such that the feathering mechanism is set to feather the airscrew only when the shut-off cock partakes of said movement in its fully closed state, a control lever and a link between said control lever and said shut-off cock, said control lever having two ranges of movement, in the first of which ranges the shut-off cock is moved between its open position and its fully closed position and in the other of which ranges the shut-off cock is moved to partake of said movement in the fully closed state, the means operatively interconnecting said shut-off cock and the feathering mechanism comprising a lost motion connection so that during the first range of movement of said control lever the feathering mechanism is not actuated and so that during movement of the control lever in the second range the feathering mechanism is set to feather the airscrew.

4. A power plant for an aircraft comprising an engine, means to supply fuel to said engine, an airscrew driven by the engine, a feathering mechanism for the airscrew, a shut-off cock in said fuel supply means for controlling the fuel supply from said fuel supply means, said shut-off cock being constructed for a movement in its fully closed state beyond the position at which it becomes fully closed, means operatively interconnecting said shut-off cock and said feathering mechanism, such that the feathering mechanism is set to feather the airscrew only when the shut-off cock partakes of said movement in its fully closed state, a control lever and a link between said control lever and said shut-off cock, said control lever having two ranges of movement, in the first of which ranges the shut-off cock is moved between its open position and its fully closed position and in the other of which ranges the shut-off cock is moved to partake of said movement in the fully closed state, the means operatively interconnecting said shut-off cock and the feathering mechanism comprising a lost motion connection so that during the first range of movement of said control lever the feathering mechanism is not actuated and so that during movement of the control lever in the second range the feathering mechanism is set to feather the airscrew, said lost motion connection comprising a rocking striker lever and a connection between said rocking striker lever and said shut-off cock whereby said rocking striker lever is displaceable by movement of the control lever, a forked lever carrying a pair of spaced abutments to be engaged by the rocking striker lever and a connection between said forked lever and said feathering mechanism, said rocking striker lever being arranged to move between said abutments during movement of the control lever over its first range of movement and to engage one of said abutments and to displace the forked lever to set the feathering mechanism during movement of the control lever over its second range of movement.

5. A power plant for an aircraft comprising an engine, means to supply fuel to said engine, an airscrew driven by the engine, a feathering mechanism for the airscrew, a shut-off cock in said fuel supply means for controlling the fuel supply from said fuel supply means, said shut-off cock being constructed for a movement in its fully closed state beyond the position at which it becomes fully closed, means operatively interconnecting said shut-off cock and said feathering mechanism, such that the feathering mechanism is set to feather the airscrew only when the shut-off cock partakes of said movement in its fully closed state, a control lever and a link between said control lever and said shut-off cock, said control lever having two ranges of movement, in the first of which ranges the shut-off cock is moved between its open position and its fully closed position and in the other of which ranges the shut-off cock is moved to partake of said movement in the fully closed state, said feathering mechanism comprising a hydraulic motor to effect feathering and unfeathering of the airscrew, a hydraulic pump to supply said motor, an electric motor to drive said pump, and switching means to control the current supply to said motor, said switching means being closed by said control lever for operation when said control lever moves in its second range.

LIONEL HAWORTH.

References Cited in the file of this patent

UNITED STATES PATENTS

| Number | Name | Date |
|---|---|---|
| 2,179,492 | Caldwell et al. | Nov. 14, 1939 |
| 2,181,985 | Waseige | Dec. 5, 1939 |
| 2,346,007 | Chillson | Apr. 4, 1944 |
| 2,391,629 | Keller | Dec. 25, 1945 |
| 2,402,065 | Martin | June 11, 1946 |
| 2,499,813 | Brady | Mar. 7, 1950 |
| 2,500,811 | Forsyth | Mar. 14, 1950 |